United States Patent
Huntington

[11] Patent Number: 5,449,130
[45] Date of Patent: Sep. 12, 1995

[54] HOT AIR BALLOON AMUSEMENT RIDE

[76] Inventor: Mary K. Huntington, 1804 Davis, McHenry, Ill. 60050

[21] Appl. No.: 316,538

[22] Filed: Sep. 30, 1994

[51] Int. Cl.⁶ .......................... B64B 1/50; B64B 1/62
[52] U.S. Cl. ...................................... 244/33; 244/31; 244/99
[58] Field of Search ................. 244/30, 31, 33, 96, 244/97, 99

[56] References Cited

U.S. PATENT DOCUMENTS

| | | | |
|---|---|---|---|
| 911,260 | 2/1909 | Pennock | 244/33 |
| 967,571 | 8/1910 | Schlueter | 244/33 |
| 969,732 | 9/1910 | Tebyrica | 244/33 |
| 2,345,550 | 9/1940 | Berman | 244/33 |
| 2,433,344 | 5/1943 | Crosby | 244/33 |
| 2,629,115 | 2/1953 | Hansen | 244/33 |
| 3,531,064 | 9/1970 | McCutchan | 244/97 |
| 3,605,329 | 9/1971 | Dalli | 244/33 |
| 3,814,353 | 6/1974 | Nelson | 244/31 |
| 3,865,251 | 2/1975 | Langford | 244/33 |
| 4,421,204 | 12/1983 | Lawrence | 244/33 |
| 4,619,422 | 10/1986 | Petrehn | 244/31 |
| 4,842,221 | 6/1989 | Beach et al. | 244/33 |

FOREIGN PATENT DOCUMENTS

| | | | |
|---|---|---|---|
| 2612485 | 9/1988 | France | 244/97 |
| 3502037 | 7/1986 | Germany | 244/33 |
| 127633 | 6/1919 | United Kingdom | 244/99 |
| 2260956 | 5/1993 | United Kingdom | 244/99 |

*Primary Examiner*—Andres Kashnikow
*Assistant Examiner*—Virna Lissi Mojica
*Attorney, Agent, or Firm*—Kajane McManus

[57] ABSTRACT

The hot air balloon ride includes a balloon envelope having a basket attached thereto. The balloon is engaged by tether lines extending from grounded weights, the tether lines limiting extent of rise of the balloon. The basket includes an entryway and has further been modified to allow a gas tank for same to be engaged thereto, outside the basket. Further, the bottom surface of the basket is cushioned, and a pair of rip panels have been incorporated into the crown of the balloon, one of which is manually operable and the other of which would operate automatically if the balloon becomes disengaged from the tether lines.

1 Claim, 4 Drawing Sheets

FIG. 5
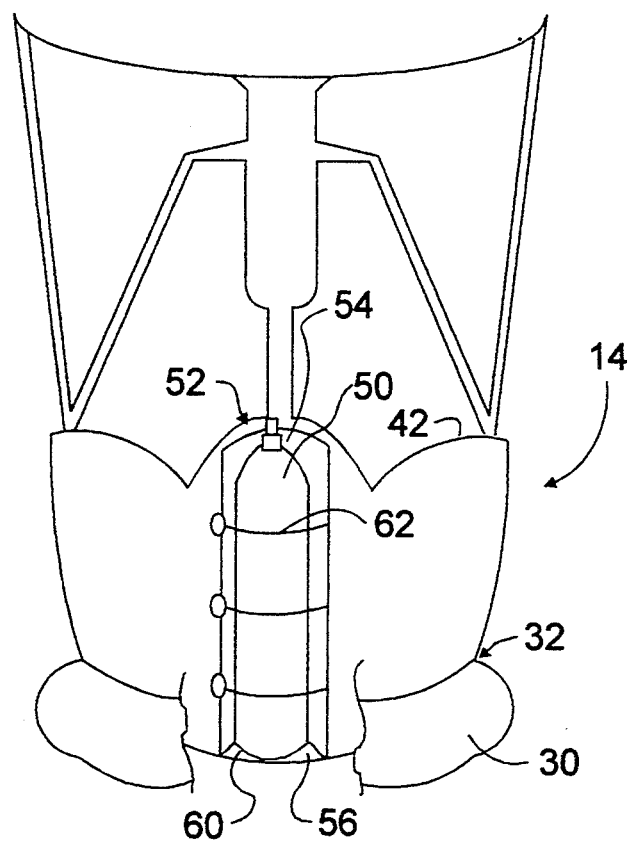
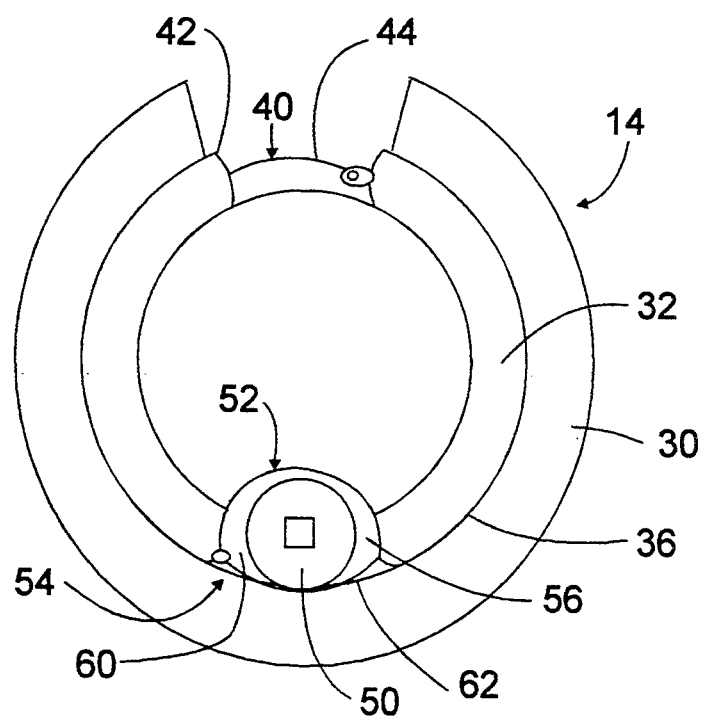
FIG. 6

HOT AIR BALLOON AMUSEMENT RIDE

BACKGROUND OF THE INVENTION

1. Field of the Invention

The present invention relates to an amusement ride, the primary structure of which is a tethered hot air balloon and attached basket. More specifically, the balloon is permanently tethered to the ground, with an upward ride thereof being limited by a plurality of tethers. Also, the basket has been modified to simplify passenger accommodation and exchanging of fuel tanks supplying the burner of the balloon.

2. Description of the Prior Art

Heretofore, the thrill of hot air ballooning has not been available to the general public at a nominal charge. Balloon enthusiasts have had to purchase their own equipment, or, if rides on such equipment have been offered, they have been purchased at a significant expense, more than the average member of the general public can afford.

By the provision of the hot air balloon amusement ride of the present invention, the average person is afforded the thrill of a short, secured to the ground, hot air balloon ride for a nominal fee.

SUMMARY OF THE INVENTION

According to the invention there is provided a hot air balloon ride including a balloon envelope and a basket suspended therefrom, the ride comprising a plurality of weights placed in a circular array about the balloon envelope, an equal plurality of tether lines of predetermined length, one tether line extending from each weight to and engaging with a load ring engaged to the balloon envelope at a crown area thereof, the basket being configured to include an entryway in a sidewall thereof and having a further portion of the sidewall being inwardly indented to form a platform therebeneath upon which a gas cylinder for use in creating hot air may be placed, a bottom wall of the basket also including a cushion thereon, and the balloon envelope including a pair of rip panels therein, each activated by a rip cord, one rip cord being engaged to the basket and a second rip cord being engaged to one of the weights.

BRIEF DESCRIPTION OF THE DRAWINGS

FIG. 5 is a rear view of the modified basket of the ride.

FIG. 6 is a top plan view of the modified basket of the ride.

DESCRIPTION OF THE PREFERRED EMBODIMENT

Figure 1:
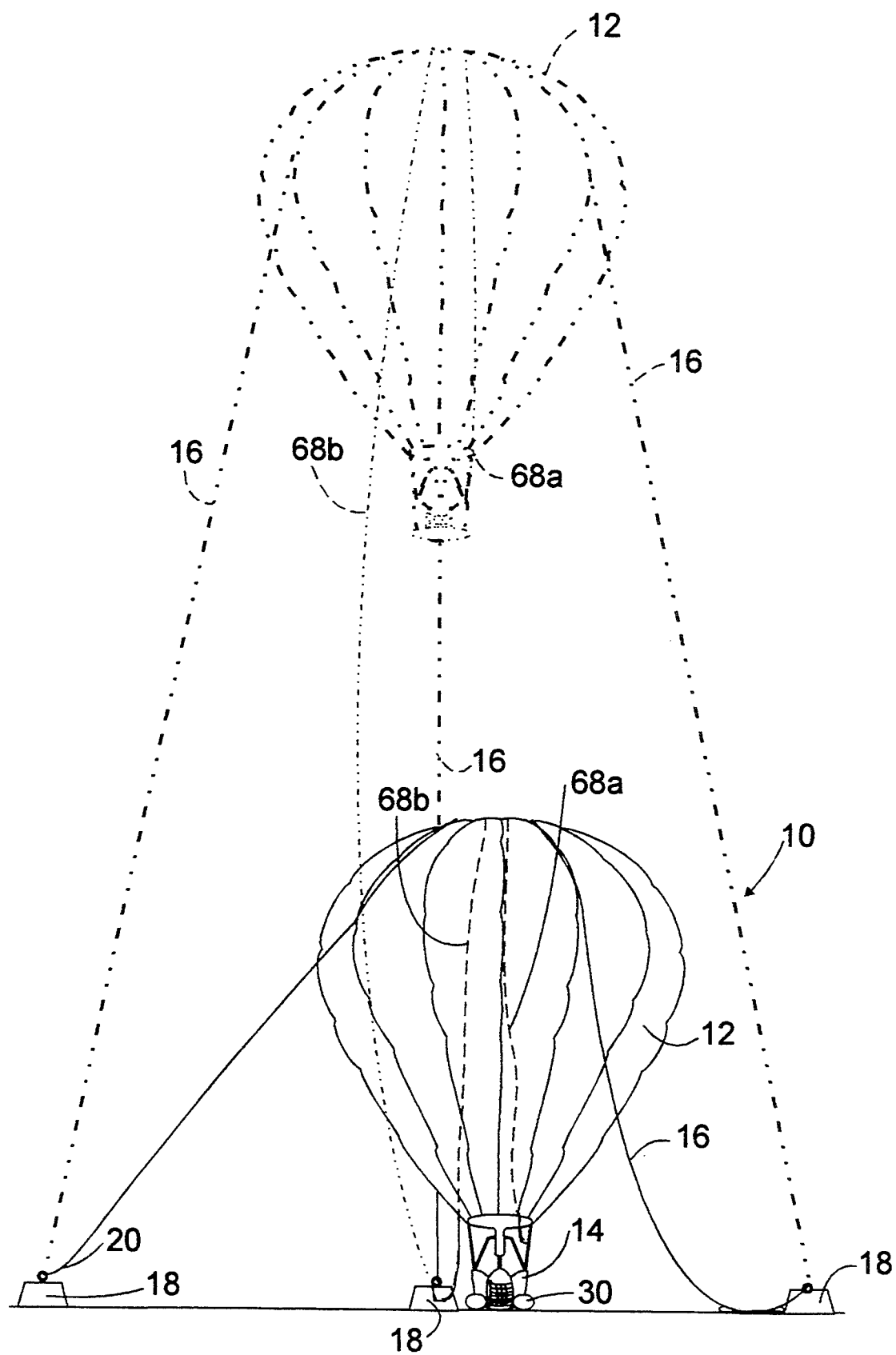
FIG. 1 is a perspective view showing a balloon and its basket grounded at an off centered position and showing in phantom the balloon and its basket in a centered elevated position between tethers provided to maintain ground engagement.

Referring now to the drawings in greater detail, there is illustrated therein the hot air balloon amusement ride made in accordance with the teachings of the present invention and generally identified by the reference numeral 10.

The ride 10 includes a balloon envelope 12 which, when filled with hot air, is maintained suspended above a basket 14 which is engaged to the balloon envelope 12 in known manner.

As shown, the ride 10 further includes a plurality of tethers or tether lines 16 which are engaged to grounded weights 18, the weights 18 being configured in a manner to be movable when necessary.

In this respect, it is preferred to provide a plurality of at least five such grounded weights 18, with each weight 18 weighing no less than 700 lbs. Through empirical testing it has been found that a balloon envelope 12 having a volume no greater than 75,000 cu. ft. can be kept from attaining free flight by engaging approximately 3,500 lbs. of weight to the tether lines 16.

The weights 18 may be created by, for example, water or sand filled receptacles which can be easily emptied for transportability.

To each such weight 18, one end 20 of a tether line 16 is attached, with the other end 22 of the tether line 16 being engaged to a load ring 23 engaged at the top of the balloon envelope 12 to the balloon envelope 12 by a plurality of balloon harness lines 24, commonly referred to as sewn on tapes 24.

Thus, when the balloon ride 10 is elevated to an uppermost position thereof allowable by the chosen length of the tether lines 16, the balloon envelope 12 will be maintained centered and nested within the plurality of tether lines 16 provided.

Figures 2, 3:
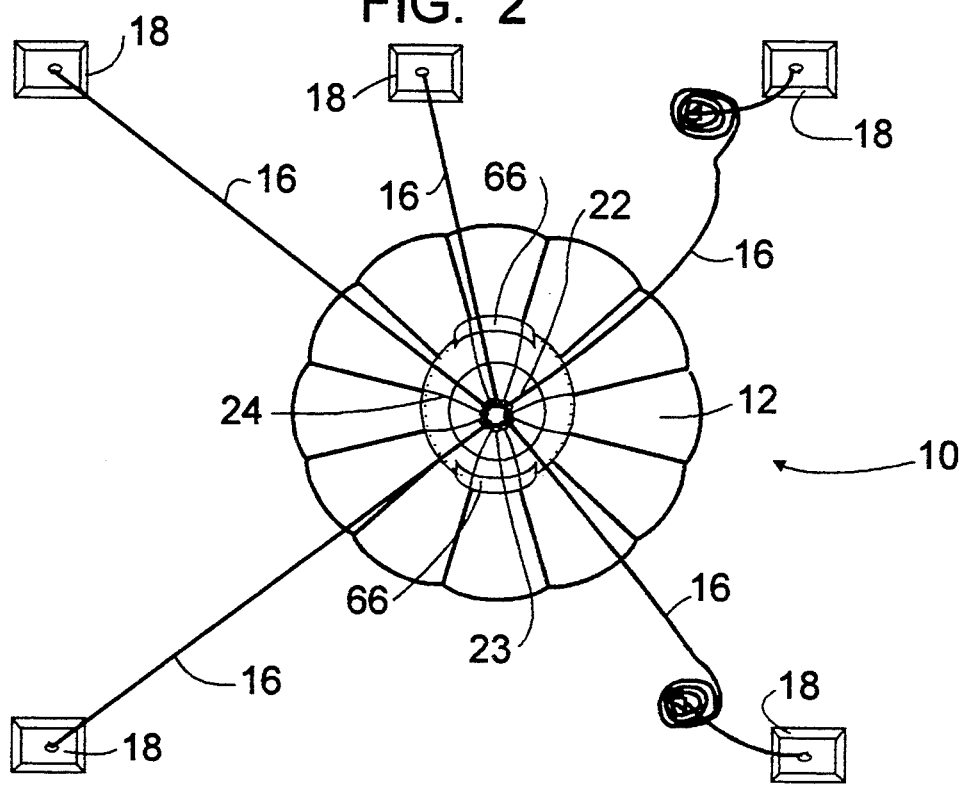
FIG. 2 is a top plan view showing the balloon grounded in an off center position and showing the relative position of the tethers thereto.
FIG. 3 is a top plan view showing the balloon elevated and centered relative to the tethers.
Figure 4:
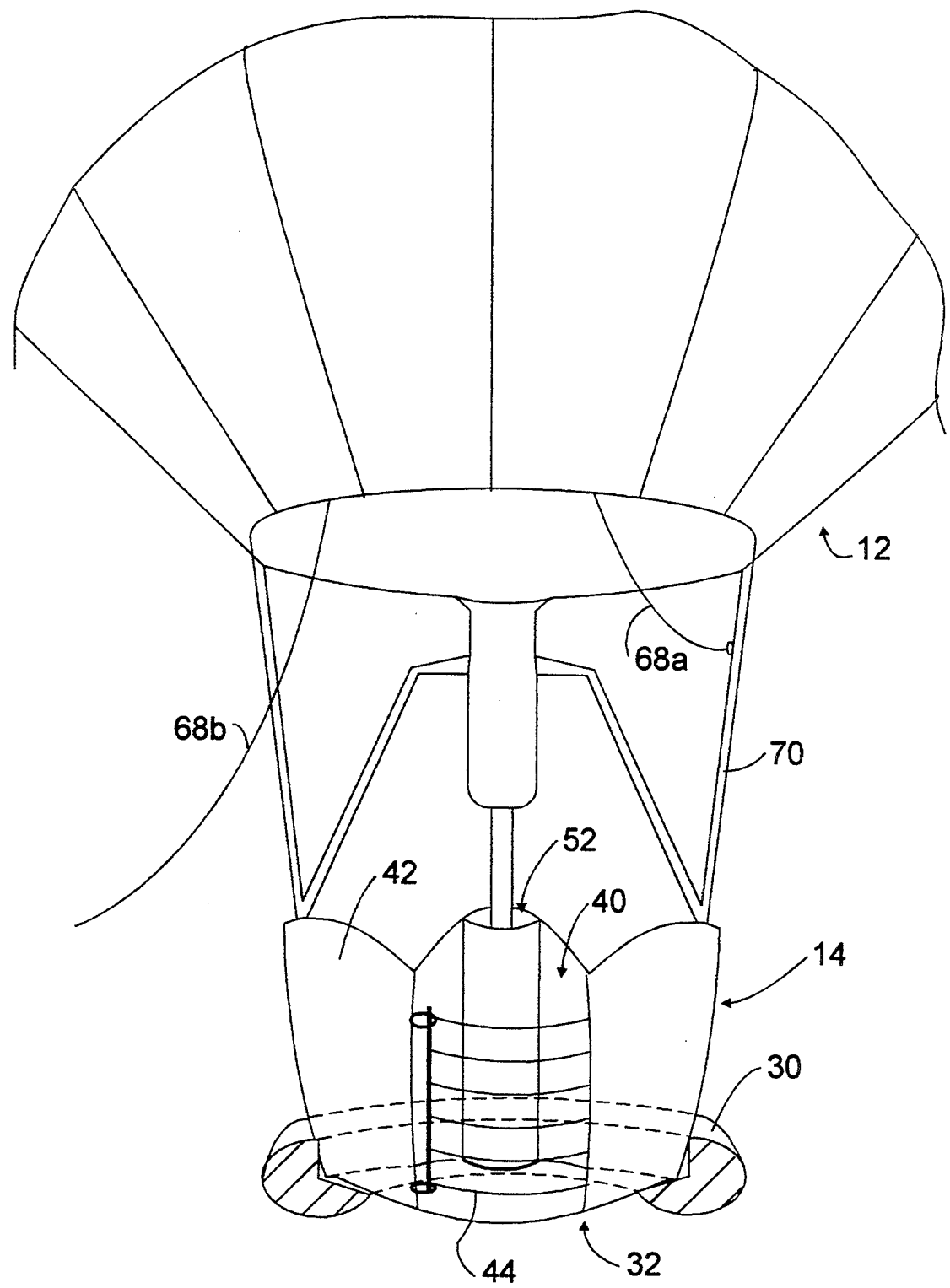
FIG. 4 is a front view of a modified basket of the ride.

As best shown in FIGS. 2 and 3 the weights 18 engaged to the grounded tether lines 16 are spread in a circular array around the balloon envelope 12, at a prescribed distance from each other. When the air in the balloon envelope 12 is heated, it rises, taking the basket 14 with it, until the crown of the balloon envelope 12 is ensnared within the confines created by the tether lines 16, the balloon envelope 12 being centered within the lines 16 when the balloon envelope 12 rises to the highest point allowed by the tether lines 16.

The load ring 23 to which the tether lines 16 are attached at the crown of the balloon envelope 12 ensures centered positioning of the balloon envelope 12 while in flight.

When the balloon envelope 12 is to be brought down, no further heat is generated, and the balloon envelope 12 slowly drops.

If the day is calm, the basket 14 will alight at a position relatively centered between the weights 18. On the other hand, if the day is windy, the wind will push the balloon laterally, so it lands at an off center position, such position being determined by the length of the tether lines 16 on the windward side of the balloon envelope 12.

As shown in FIG. 2, when the balloon is landed on a windy day, the lines 16 on the windward side of the balloon envelope 12 remain taut, limiting lateral movement of the balloon envelope 12 caused by the wind. Obviously, since no pressure is placed on the tether lines 16 on the side opposite that from which the wind is blowing, these lines merely float down, with any slack therein resting on the ground.

To ensure a nonjarring landing of the basket 14, it is proposed to provide a bumper or cushion 30 around a base 32 of the basket 14, the cushion 30 being made of a material which will absorb the shock on landing. The cushion 30 may be configured as shown, comprising a ring 30 engaged about a bottom end edge 36 of the basket or, if desired, the cushion 30 may be extended completely across the underside of the basket 14.

Other modifications are also proposed to the basket 14 to make it more accommodating for uses in a ride.

For example, a portion 40 of the sidewall 42 of the basket is cut away to provide an entrance 40 thereinto, rather than requiring a rider to climb in over the sidewall 42. To secure the entrance 40, a netted or webbed gate 44 may be engaged over the entrance 40 once the rider(s) have boarded the basket 14.

Further, inasmuch as the air in the balloon envelope 12 will be heated numerous times per day, the basket 14 has also been modified for ease in changing of heater gas cylinders 50. Presently, such cylinders 50 are loaded into the basket 14, over the sidewall 42 thereof. To make cylinder 50 changeovers simpler, it has been proposed to modify a portion 52 of the basket wall 42, creating an indentation 54 therein within which the gas cylinder 50 will fit. A floor 56 of the basket 14 still extends to its usual configuration, creating a ledge or shelf 60, now exterior of the basket wall 42 in the indented area 54, upon which the cylinder 50 can rest. Thus, cylinder 50 changeover is a simple matter which can now be accomplished by a ground man. It will be understood that the cylinder 50 can be removably fixed to the basket 14 in any suitable manner, such as for example, by strapping 62 as shown in FIG. 5.

To ensure that there is no possible "escape" for the balloon ride 10 from its permanently tethered condition, the envelope 12 of the balloon has been provided with a backup deflation system.

Here, as shown in FIGS. 1-4, two tear away rip panels 66 are provided in the crown of the balloon envelope 12. Each of these rip panels 66 comprises a section of the balloon envelope 12 which is engaged to the remainder of the envelope by a reusable adhesive member, such as that commonly referred to as Velcro TM. Attached to each rip panel and extending downwardly therefrom through the balloon envelope 12 a rerip cords 68a and 68b.

One rip cord 68a is engaged to an upright 70 of the basket 14 while the other, 68b, is attached to one of the weights 18.

Each rip cord 68a, 68b may be pulled to cause the associated rip panel 66 to tear away from engagement with the remainder of the balloon envelope 12, causing the balloon envelope 12 to deflate, with an imminent landing to follow.

The rip cord 68a attached to the basket 14 is for use by the ride operator to cause deflation, if necessary. In a case where, for some reason, an operator would not be available to cause deflation, the rip cord 68b attached to the weight 18, or some other grounded structure, would cause deflation by being extended to a taut position thereof, which, when the extent of the rip cord 68b is surpassed, will cause the rip panel 66 engaged thereto to rip away from engagement from the balloon envelope 12.

This secondary, grounded rip cord 68b is provided to ensure balloon deflation if the balloon ride 10 should somehow disengage itself from its mooring.

In use, a rider or plurality of same enter the basket 14 through the entry 40 formed therein, with the operator closing off the entry 40 with the provided structure 42.

Heat going upwardly into the balloon envelope 12 is increased until lift is attained, the maximum extent of lift being controlled by the length of the tether lines 16. After a chosen time period of being maintained airborne, heat is no longer supplied and the balloon envelope 12 begins to sink, landing as described hereinabove.

It will be understood that the grounded rip cord 68b must be longer than the tether lines, so that undesired balloon deflation does not take place.

As described above, the balloon ride 10 of the present invention has a number of advantages some of which have been described above and some of which are inherent in the invention. Also, modifications may be proposed to the balloon ride 10 without departing from the teachings herein. Accordingly the scope of the invention is only to be limited by the accompanying claims.

I claim:

1. A hot air balloon ride including a balloon envelope and a basket suspended therefrom, the ride comprising a plurality of weights placed in a circular array about the balloon envelope, an equal plurality of tether lines of predetermined length, one tether line extending from each weight to and engaging with a load ring engaged to the balloon envelope at a crown area thereof, the basket being configured to include an entryway in a sidewall thereof and having a further portion of the sidewall being inwardly indented to form a platform therebeneath upon which a gas cylinder for use in creating hot air may be placed, a bottom wall of the basket also including a cushion thereon, and the balloon envelope including a pair of rip panels therein, each activated by a rip cord, one rip cord being engaged to the basket and a second rip cord being engaged to one of the weights.

* * * * *